United States Patent [19]

Navaree et al.

[11] Patent Number: 5,681,483

[45] Date of Patent: Oct. 28, 1997

[54] PROCESS FOR THE TREATMENT OF OILY SUSPENSIONS

[75] Inventors: Francois-Pierre Navaree, Charbonnieres Les Bains; Alain Fraux, Herieux; Bernard Michel Bossand, Communay, all of France

[73] Assignees: Elf Antar France, Courbevoie; Institut Francais Du Petrole, Rueil Malmaison, both of France

[21] Appl. No.: 429,945

[22] Filed: Apr. 27, 1995

[30] Foreign Application Priority Data

Apr. 29, 1994 [FR] France .................................. 94 05263

[51] Int. Cl.$^6$ .............................. B01D 21/26; B01D 37/02
[52] U.S. Cl. .................... 210/777; 210/787; 210/402; 210/407; 210/380.1; 210/396
[58] Field of Search ...................... 210/777, 778, 210/779, 780, 787, 781, 784, 791, 803, 380.4, 346, 402, 407; 427/240, 241, 230, 238

[56] References Cited

U.S. PATENT DOCUMENTS 2,055,869 9/1936 Manning .
3,356,218 12/1967 Grudoski .
3,758,163 9/1973 Warning .................................. 210/396
3,919,088 11/1975 Doncer et al. ......................... 210/402
4,280,913 7/1981 Applegate et al. .

FOREIGN PATENT DOCUMENTS 0 283 381 9/1988 European Pat. Off. .

OTHER PUBLICATIONS

PTO 97–0374, Translation of European Patent 0 283 381 Sep. 21, 1988.

*Primary Examiner*—David Reifsnyder
*Attorney, Agent, or Firm*—Burgess, Ryan & Wayne

[57] ABSTRACT

A process is provided for the treatment of suspensions comprised of oil, water and solids in which the suspension is subjected to centrifugation employing a centrifugal filter, coated with an organic powder having an index of compressibility comprised between 0 and 1.2, and wherein under the effect of the centrifugation, the suspension is subjected to an acceleration comprised between 10 and 2500 times the gravity force, that is, 100 to 25000 m/s$^2$. The solids are retained by the coating and the centrifugate is collected. The invention is useful for the treatment of crude oil, of lubricants and oils which produce suspensions or emulsions rich in fats.

11 Claims, 1 Drawing Sheet

PROCESS FOR THE TREATMENT OF OILY SUSPENSIONS

BACKGROUND OF THE INVENTION

1) Field of the Invention

This invention concerns a process for the treatment of an oily suspension comprising water, oil and solids, according to which process the suspension is centrifuged by means of a centrifugal-coated filter, the solids being retained by the coating and centrifugate collected.

The invention finds application in the industries of treatment of crude oil. For example, for treating the refuses or slops of refineries, the oily sludges of oils wells, the bottoms of tanks for the transportation or storage of oil products. The invention is also used for the treatment of oils of petroleum origin used for lubricating engines and compressors, the same for the treatment of cutting fluids. It is likewise applied in agroalimentary industries that produce suspensions or emulsions rich in vegetable or animal fats such as tallow.

2) Background Art

Oily suspensions cannot be disposed of in the environment just as they are in view of their pollutant nature. It has therefore been proposed to incinerate them by already known processes which consume substantial amounts of fuel, or to treat them chemically or mechanically.

Chemical treatments by surface-active agents detract from the ulterior value of the oil since a portion of the surface-active agents remains in the oil. For the treatment of hydrocarbons, their presence makes dangerous a recycling of the hydrocarbon in the desalting section of distillation units of crude oil and likewise makes impossible their treatment by catalytic processes in view of the risks of pollution of the catalysts used. Chemical treatments by surface-active agents also detract from the quality of the water recovered, the organic charge of which increases and makes difficult its treatment.

Another category of treatment is that of mechanical treatments which consume little or no thermal energy or no surface-active agents. These treatments are described in U.S. Pat. No. 4,260,489 covering a process for treatment of an oily sediment consisting in filtering the sediment in a coated filter, treating the filtration residue with a hydrocarbon solvent and purifying the extracted residue with steam. According to this process, the filter used is a bed plate or candle filter working under pressure.

This process has the inconvenience of being discontinuous and of needing manual operations for disassembling, cleaning and reassembling. It is therefore ill adapted for the treatment of oily suspensions produced by plants which work continuously. Besides, said operations are costly.

The classical centrifugation is often not adapted to the heterogeneity of the charge.

Automation is not practicable and the operation must be secured by qualified personnel which makes the cost elevated. Suspensions cannot be destabilized by this method. There can be obtained products of centrifugation too rich in oil and sediment for being recyclable in particular to biological treatment. There can be obtained oils that are too charged with water and sediments to be directly upgraded or to be recycled in distillation columns. These dentrifugal machines can only work at rotation speeds higher than 25000 m/s$^2$, which causes a costly consumption of electricity.

One other process for treatment of oily suspensions is described in French patent EPA 0 283 381 A1. In this process the suspension is filtered on a coated filter. The coating comprises sawdust, 80% by weight of the constituents of which have a size between 50 and 300 micrometers and less than 10% by weight have a size of less than 50 micrometers.

The filtration is carried out on a vacuum rotary filter revolving at a speed comprised between 5 and 100 tr/hour. The cake formed on the coating is scraped off by means of a blade and removed. This process has the following disadvantages:

- it requires a narrow range or a tightened curve of particle size distribution of the constituents of the coating for obtaining a uniform thickness which involves a high cost of the sawdust used.
- an interruption, even if of short duration, of the electric supply produces a crumbling of the coating,
- the operation, carried out at elevated temperature of around 70° C., is difficult due to the pressures of steam and of the organic products,
- the consumption of water is considerable for producing the vacuum by means of liquid pumps.
- the automation of this process is expensive and difficult due to the fact that the vacuum inside the filter must be regulated in accordance with the quality of the sludge,
- the thickness of the coating is limited practically to 200 mm, due to the fact that the difference of pressure between the 2 sides of the coating is at most equal of the atmospheric pressure,
- the coating, which have a surface that can reach 30 m$^2$, is not always homogeneous, which detracts from the quality of the filtration,
- the difference of pressure between the 2 sides of the coating is variable depending on the position of the blast pipes that produce the vacuum, which also detracts from the quality of the filtration,
- the use of vacuum pumps and blast pipes causes the process to be noisy, which is an impediment from the point of view of location,
- the large filtration surfaces make necessary the use of cumbersome devices, which are difficult to use in certain cases such as the treatment of sediments aboard offshore platforms of production of petroleum.

SUMMARY OF THE INVENTION

The object of this invention is precisely to overcome said inconveniences and to provide a very efficient and economical process for the treatment of oily suspensions.

The extent of particle size distribution of the powder used for making the coating can be broad and thus it is less expensive.

The temperature of the suspension can be adjusted to a value comprised between 40° and 120° C. depending on the characteristics of its components.

The process is well suited to an automated continuous operation.

The devices for putting in use this process are not very noisy, less than 80 decibels at a distance of 1 meter, and much less cumbersome than the other devices for similar volumes of treatment.

This process can be used for the treatment of the oily suspensions in the industries of treatment of mineral oil starting from the production to the distribution, going through the refining step including the storage and transportation operations.

This process can also be used in agroalimentary industries that produce suspensions rich in fats and proteins or vegetable and animal fats and the organic effluents.

For said purposes the invention proposes a process for treatment of a suspension comprising an organic fraction consisting of oil of petroleum origin or of emulsifiable products of vegetable or animal origin, solids and water, according to which process the suspension is centrifuged by means of a centrifugal coated filter equipped with a rotary basket of cylindrical, cylindroconical, or conical shape, the solids being retained by the coating to form a cake and the centrifugate being collected, and according to which there is used a coating formed of powdered material having a compressibility index comprised between 0 and 1.2. The compressibility index is defined by the formula $x = k (\Delta P)^n$.

$\Delta P$ being the pressure exerted on the filter cake;

k=coefficient of proportionally n=compressibility index x=filtration capacity in $m^3/m^2/kg$ solids.

According to this process said coating is disposed on a cloth or sieve covering one internal side of the perforated wall of the rotary basket which is rotated at a speed such that at the level of the coating the suspension is subjected to an acceleration comprised between 100 and 25,000 $m/s^2$. The suspension is introduced in the basket where it is subjected to a centrifugation.

According to another characteristic of the process, there is used a coating made prior to the treatment of a suspension by introducing into the basket a mixture of fluidizing agent or water and organic powder at a temperature comprised between 15° and 40° C. and subjecting said mixture to a centrifugation until obtaining a coating of a thickness comprised between 1 and 60 cm, preferably 10 to 30 cm.

According to another characteristic, the compressibility index of the coating is comprised between 0 and 0.7, the treated suspension comprises 85 to 98% water, 1 to 10% oil or emulsifiable products and 1 to 10% solids, under the effect of the centrifugation, the centrifugate collected outside the basket is formed by at least 99.5% water, the oil or emulsifiable products being retained by the coating.

According to another characteristic, the compressibility index of the coating is comprised between 0 and 0.5, the speed of the basket is adjusted to obtain an acceleration of the suspension at the level of the coating comprised between 500 and 25000 $m/s^2$, the suspension comprising from 30 to 50% water, 40 to 60% oil or emulsifiable products and 5 to 15% solids, under the effect of the centrifugation, the water and the oil or emulsifiable products pass through the coating and are collected outside the rotary basket.

According to another characteristic, the compressibility index of the coating is comprised between 0 and 1, the speed of the basket is adjusted to obtain an acceleration of the suspension at the level of the coating comprised between 100 and 20000 $m/s^2$, the suspension comprising less than 5% water, 80 to 95% oil or emulsifiable products and 0.1 to 4% solids, to said suspension is added a fluidizing product in proportions comprised between 10 and 50% by weight in relation to the oil phase and a hydrophilic powder at the rate of 0.8 to 1.2% by weight of the suspension, the mixture thus obtained is injected in the basket, under the effect of the centrifugation, said mixture separates to produce a centrifugate which passes through the coating, the water being absorbed by the hydrophilic powder.

According to another characteristic, quicklime is added to the suspension at the rate of 0.2 to 2% by weight.

According to another characteristic, the suspension is an oil of petroleum origin having carried out a lubrication function, the fluidizing product is gas-oil from catalytic cracker and the centrifugate obtained is motor fuel for diesel engines.

According to another characteristic, the coating is made oleophobic by impregnation with water prior to the treatment of the suspension, which comprises from 50 to 70% water, 10 to 40% oil or emulsifiable products of a density comprised between 0.8 and 0.9 and from −0.1 to 10% solids. Under the effect of the centrifugation, the water passes through the coating with less than 10% oil or emulsifiable products and at least 90% oil or emulsifiable products remain inside the basket where they are recovered.

The viscosity of the suspension is adjusted to a value comprised between 4 and 20 mPa.s by adjusting its temperature to between 40° and 120° C. and/or by mixing with a fluidizing product. Powdered charcoal coke is added to the suspension at the rate of 0.2 to 0.8% by weight.

The cake is eliminated by means of a mechanical device comprising a blade situated inside the rotary basket according to a generating line until reducing the thickness of the coating to a value of less than 1 cm. The cake is finally used as fuel.

The centrifugate obtained by treatment of an oil of petroleum origin having carried out a lubrication function to which gas-oil from catalytic cracker agent had been added as fluidizing agent, is used as motor fuel for feeding diesel engines.

DETAILED DESCRIPTION OF THE INVENTION

Figure 1:
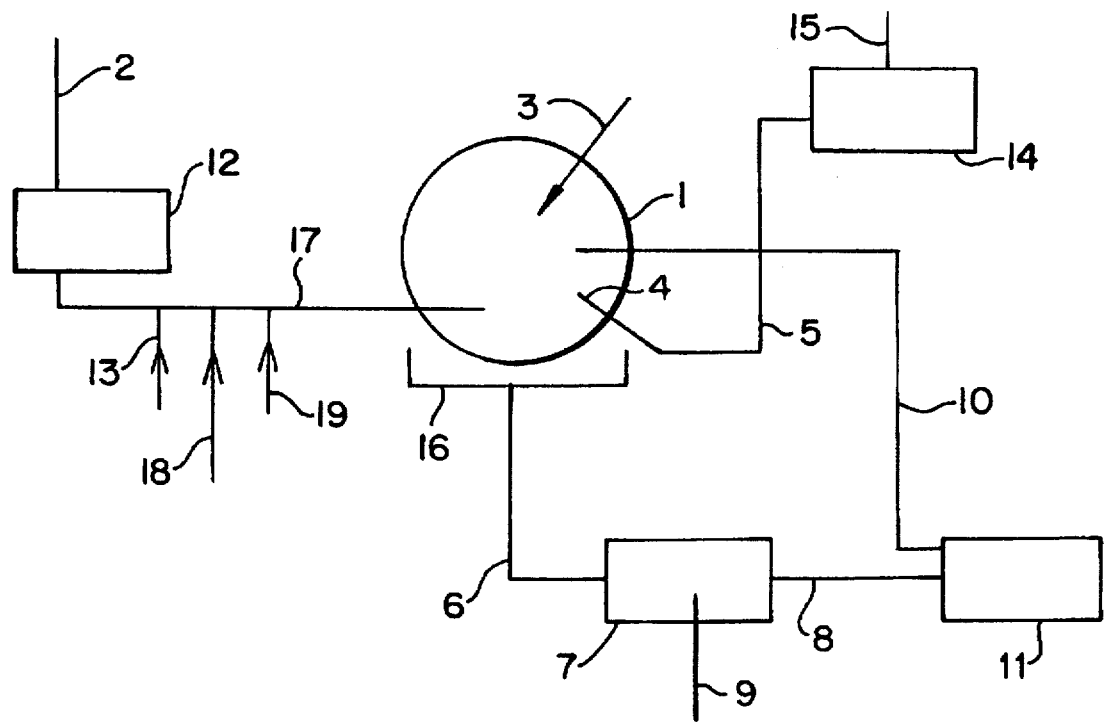
FIG. 1 diagrammatically shows a device for carrying out the process object of the invention.
Figure 2:
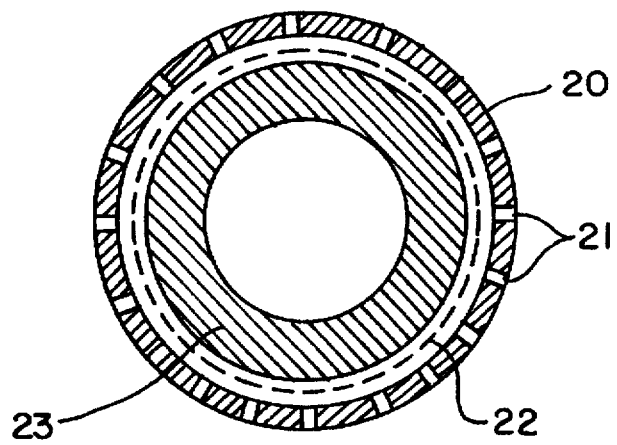
FIG. 2 shows a cross sectional view of a basket of coated centrifugal filter.

According to an embodiment shown in FIGS. 1 and 2, the device for carrying out the process object of the invention comprises:

a rotary basket 1 of cylindrical or conical shape, an inlet pipe 2 of the suspension to be treated, a stopper flask 12, a pipe 17 connecting the flask 12 to the basket 1, the tank for storing the oil, a pipe 3 for supplying the powder, heating means, means 4 for scraping the cake, a pipe 13 for supplying the fluidizing agent, a pipe 18 for supplying a powdered mineral agent, a pipe 19 for supplying charcoal coke powder, a machine 14 for transforming the cake, exhaust means 5 connecting the scraping knife 4 to the machine 14, a pipe 15 for supplying the fuel additive, a vat 16 for recovering the filtrate, a tank 7 for storing the filtrate, a pipe 6 connecting the tank 16 to the tank 7, a pipe 8 connecting the tank 7 to the tank 11, a pipe 9 for discharging the water of the tank 7, a pipe 10 connecting the basket to the tank 11.

According to the process of the invention, the suspension to be treated comprising an oil of petroleum origin or emulsifiable products of animal or vegetable origin, solids and water reaches by the line 2 into a stopper flask (12). Then the suspension is conveyed by the line (17) passing beyond the stopper flask (12) to the interior of the rotary basket (1) of cylindrical, conical or cylindroconical shape where it is subjected to a centrifugation.

The suspension is subjected to an acceleration of from 100 to 25000 m/s2.

The relation between g the speed of rotation and the diameter of the basket is given by the formula:

$$g = 5.6 \times 10^{-6} N^2 D$$

N=revolution/minute

D=diameter in meters

Under the effect of this centrifugation, the suspension is separated on the one hand into a centrifugate which is collected in the vat (16) and on the other hand into solids which are retained by the coating (23) of organic powder.

The centrifugate is then conveyed by the pipe (6) into the tank (7) where it decants. When the centrifugate contains water, the latter is eliminated by the pipe (9), the oil is collected and guided by the pipe (8) and into the tank (11).

According to another characteristic of the invention, there is used a coating of organic powder, the constituents of which have a size of more than 20 micrometers. This powder can be composed of different materials such as wood, charcoal, lignite or petroleum coke, corn powder, powdered or granulated active coal porous asphalt, coal or a composite powder made of a mixture.

Prior to the treatment of the suspension, the coating is formed by introducing through the line (3) a mixture of powder or organic matters and water or a fluidizing product of the suspension such as a gas-oil, a jet fuel, or preferably LCO.

The organic powder is held by the sieve (22) to form the coating. The introduction of the mixture of powder and water or fluidizing agent is stopped when the thickness of the coating (23) reaches the desired value such as 30 cm.

According to another characteristic of the invention, the viscosity of the suspension is adjusted to a value comprised between 4 and 20 mPa.s by adjusting its temperature to a value comprised between 40° and 120° C. This maximum value is an important advantage of the invention. The viscosity may likewise be adjusted by admixing to the suspension a fluidizing product through the line (13).

According to another characteristic of the invention, to the suspension is admixed by the line (18) a hydrophilic mineral agent in powder form such as lime, silica gel or used catalyst such as that of the catalytic cracker.

According to another characteristic of the invention, to the suspension is admixed charcoal coke powder by injecting through the line (19) at a rate of from 0.2 to 0.8% by weight.

According to another characteristic, the cake formed by the matters in suspension held by the coating (23) is scraped by means of a scraper (4) situated inside the rotary basket according to a generating line until reducing the thickness of the coating which has a value of more than 1 cm.

It is not necessary to remove the rest of the coating for making a new coating, as is the case in other processes.

The cake thus scraped is guided by the exhaust means (5) up to the treatment machine (14).

According to a last characteristic of the invention, the cake obtained by scraping can be used as fuel.

The invention will be better understood by taking into consideration the embodiments given herebelow.

In FIG. 2 has been shown the basket (1) with its wall (20) provided with a plurality of holes (21) and on its inner side with a sieve (22) on which is deposited the coating (23) of organic powder having a compressibility index between 0 and 1.2.

EXAMPLE 1

The treated suspension is an oily suspension of petroleum origin which has carried out a lubrication operation.

It has the following characteristics:

| color | black |
|---|---|
| density | 0.893 |
| viscosity | 78 mm$^2$/s (or cSt) at 40° C. |
| solids content | 3.8% (3 to 100 μm) |
| water content | 0.2% |
| oil content | 96.00% |
| flashing point | 189° C. |
| acid index | 5.7 |
| sulphur content | 0.883% |
| flowing point | −42° C. |

To make the coating, there is used a pine sawdust containing 90% of particles of from 50 to 250 μm, of apparent density of 0.2 g/cm$^3$ and 3% by weight of resin.

The sawdust is mixed with LCO (light cycle oil), available at low price in refineries equipped with catalytic crackers, prior to being injected in the basket which revolves at 400 tr/mn in a manner such that the LCO/sawdust mixture is subjected by centrifugation to an acceleration of 450 m/s$^2$. The characteristics of the LCO used are the following:

| density | 0.97 |
|---|---|
| viscosity | 2.5 mm$^2$/s (or cSt) at 50° C. |
| flashing point | 97° C. |
| sulphur content | −54° C. |
| nitrogen content | 785 ppm |

The operation of injection of the LCO and sawdust mixture is discontinued when the coating has a thickness of 10 cm.

The suspension to be treated is mixed with LCO in a proportion of 30% by weight in relation to the oil phase at a temperature of 25° C., with quicklime at a rate of 1% by weight and with powdered charcoal coke at a rate of 0.5% by weight. One of the advantages of the LCO is its richness in aromatic hydrocarbons which have a considerable dissolving power of heavy hydrocarbons which in its absence would make the coating impervious to oily matters.

The mixture thus obtained is injected in the basket which revolves at 400 tr/mn.

Under the effect of the centrifugation, the light portion of the liquid of the mixture passes through the coating and the matters in suspension settles on the coating.

The cake thus formed is automatically removed by means of a scraper which advances progressively until it uncovers the part of the coating itself.

The liquid fraction stemming from the suspensions and from LCO is sweetened when it passes through the coating which contains the lime. The products of the sweetening reaction, the matters in suspension and the heavy fraction of the suspension constitute the hydrocarbonated elements which improve the energetic content of the organic powder. The heating power thereof is about 23.10$^6$ J/kg.

The liquid fraction which passes through the coating appears as an odorless, dark brown liquid having the following characteristics:

| | |
|---|---|
| density | 0.9 |
| viscosity | 23.8 mm$^2$/s (or cSt) at 40° C. |
| flashing point | 156° C. |
| sulphur content | 1.4% |
| flowing point | −12° C. |
| turbidity point | −12° C. |
| minimum temperature of filterability | −5° C. |
| Distillation intervals: | |
| central point | 205° C. |
| 20% point | 290° C. |
| 50% point | 400° C. |
| 70% point | 450° C. |
| final point | 500° C. |
| solids content | indeterminable |

This liquid is stable and behaves normally in a diesel engine, since its cetane index is comprised between 45 and 46.

The electric consumption of the installation is of 150 KW/hour per ton of treated suspension.

Material balance:

5000 t suspension (oil used)

1250 t LCO 80 t wood dust 50 t quicklime 30 t powdered coke produce a cake of 1160 t and 5250 t of diesel fuel.

The 1160 t cake is mixed with 840 t polymer waste in an extruder for furnishing 2000 t fuel having a low heat value of less than 31.10$^6$ J/kg.

EXAMPLE 2

The suspension treated is an oily suspension of refinery having the following characteristics:

| | |
|---|---|
| color | black |
| density | 0.978 |
| viscosity | 5 mPa.s at 50° C. |
| solids content | 6% |
| water content | 60% |
| oil content | 40% |

The coating is constituted by sawdust, for example, of pine, containing 90% particles of from 50 to 250 µm of apparent density of 0.13 g/cm$^3$, regardless of the content of resin. The filtering cloth disposed on the internal wall of the basket is made of polypropylene monofilament of 40 µm mesh.

The sawdust is mixed with water prior to being injected in the rotary basket which revolves at 400 tr/mn. The operation is suspended when the thickness of the coating reaches 10 cm.

The suspension is injected into the basket which revolves at 600 tr/mn. Under the effect of the centrifugation, the water passes through the sawdust coating with less than 4% oil, an oil having a density of 0.888 remains inside the basket without going through the coating. The supernatant oil is driven by pressure to a recovery flask by means of a siphon tube.

The solid matters settle on the coating.

The level of supernatant having been reduced to minimum, a scraper progressively advancing automatically removes the cake consisting of solids, oils, sawdust and some water. The matters thus scraped until the coating has a thickness of 1 cm are taken by a conveyor screw and a drier screw to a machine which treats them.

The fraction of liquid that passes through the coating is decanted into a flask. The water phase obtained contains on an average 9 mg/kg of dissolved hydrocarbons.

This water can be treated by a conventional unit of biological treatment.

The decanted oil phase added to the oil collected inside the basket contains no more detectable water. The characteristics are the following:

| | |
|---|---|
| color | brown |
| density | 0.888 |
| viscosity | 4.4 mm$^2$/s (or cSt) at 50° C. |
| sulphur content | 1.18% by weight |

This oil can be recycled in a unit of treatment of crude oil or be used in fluidizing agent.

The scraped matters appear in the form of a dark powder containing by weight:

25% hydrocarbons

42% water

18% organic powder

15% ashes

They have a higher heat value on an average of 65.10$^6$ J/Kw.

The consumption of electric energy is of 150 kWh per ton of treated suspension.

The material balance that follows shows the importance of this method: from 4000 t suspension and 840 t sawdust is obtained:

1550 t hydrocarbons 2000 t water 530 t fuel cake

This cake can be mixed with 370 t hydrocarbons, 700 t polymers and 100 t organic powder to yield 1700 t fuel having a low heat value of 33.10$^6$J/kg.

It is to be noted that it is not necessary to destroy the remaining coating after scraping; it can be reloaded with the powder without difficulty.

The above example is not limiting, it being possible, for example, to make the coating useful by employing a viricide or bactericide treated powder or an organic powder having a large surface such as active coal or specific characteristics with respect to polluting agents, for example, the phenols.

This coating or a fraction (22) can have a permanent nature and behave as real coalescer in synthetic or mineral organic matter. Once saturated and inactive,,said coating can be separated and serve as component, for example, of solid combustible—or material made from the scraped matters.

We claim:

1. A process for the treatment of a suspension comprising an organic fraction composed of oil of petroleum origin or emulsifiable products of animal or vegetable origin, solids and water, which process comprises centrifuging the suspension by means of a coated centrifugal filter provided with a rotary basket of cylindrical or conical shape, the solids being retained in the coating to form a cake and a centrifugate being collected, wherein a coating formed of a powdery matter having a compressibility index comprised between 0 and 1.2, is placed on a cloth covering an internal side of a perforated wall of said rotary basket, rotating said rotary basket at a speed such that said suspension is subjected at the level of said coating to an acceleration between 100 and 25000 m/s² and introducing said suspension into said basket where it is subjected to a centrifugation.

2. A process according to claim 1, wherein the coating is prepared prior to the treatment of the suspension, by introducing into said rotary basket a mixture of fluidizing agent or water and organic powder at a temperature comprised between 15° and 40° C. and subjecting said mixture to a centrifugation until a coating is obtained having a thickness comprised between 1 and 60 cm, preferably from 10 to 30 cm.

3. A process according to claim 1, wherein the compressibility index of said coating is comprised between 0 and 0.7, the treated suspension comprises from 85 to 98% water, 1 to 10% oil or emulsifiable products and 1 to 10% solids, under the effect of the centrifugation, the centrifugate collected outside said basket is composed by at least 99.5% water, the oil or emulsifiable products being retained by the coating.

4. A process according to claim 3, wherein the viscosity of said suspension is adjusted to a value comprised between 4 and 20 mPa.s by adjusting its temperature between 40° and 120° C. and/or by mixing with a fluidizing product.

5. A process according to claim 3, wherein said cake is eliminated by means of a mechanical device comprising a blade situated inside said rotary basket according to a generating line until reducing the thickness of said coating to a value of more than 1 cm.

6. A process according to claim 1, wherein the compressibility index of said coating is between 0 and 0.5, the speed of said rotary basket is adjusted for obtaining an acceleration of said suspension at the level of said coating comprised between 500 and 25000 m/s², said suspension comprising from 30 to 50% water, 40 to 60% oil or emulsifiable products and 5 to 15% solids, under the effect of the centrifugation, the water and the oil or the emulsifiable products pass through said coating and are collected outside said rotary basket.

7. A process according to claim 1, wherein the compressibility index of said coating is comprised between 0 to 1, the speed of said rotary basket is adjusted for obtaining an acceleration of said suspension at the level of said coating comprised between 200 and 20000 m/s², said suspension comprising less than 5% water, 80 to 95% oil or emulsifiable products and 0.1 to 4% solids, to said suspension are added a fluidizing product in proportions comprised between 10 and 50% by weight in relation to the oily phase and a hydrophilic powder at the rate of 0.8 to 1.2% by weight of said suspension, the mixture thus obtained is injected into said basket, under the effect of centrifugation, said mixture separates to produce a centrifugate that passes through said coating, the water being absorbed by said hydrophilic powder.

8. A process according to claim 7, wherein powdered quicklime is added to said suspension at the rate of from 0.2 to 4% by weight.

9. A process according to claim 8, wherein said suspension is an oil of petroleum origin which has carried out an operation of lubrication, the fluidizing product is gas oil from catalytic cracker and the centrifugate obtained is a fuel for diesel engines.

10. A process according to claim 7, wherein powdered charcoal coke is added to said suspension at the rate of from 0.2 to 0.8% by weight.

11. A process according to claim 1, wherein said coating is made oleophobic by impregnation with water prior to the treatment of said suspension which comprises from 50 to 70% water, 10 to 40% oil or emulsifiable products of a density comprised between 0.8 and 0.9 and from 0.1 to 10% solids, and under the effect of the centrifugation, the water passes through said coating with less than 10% oil or emulsifiable products and at least 90% oil or emulsifiable products remain inside said basket where they are recovered.

* * * * *